United States Patent
Wedel et al.

(10) Patent No.: US 7,818,718 B2
(45) Date of Patent: Oct. 19, 2010

(54) UNDOING USER ACTIONS IN A CLIENT PROGRAM

(75) Inventors: Malte Wedel, Mannheim (DE); Andreas Roessler, Ludwigshafen (DE)

(73) Assignee: SAP AG, Walldorf (DE)

( * ) Notice: Subject to any disclaimer, the term of this patent is extended or adjusted under 35 U.S.C. 154(b) by 1175 days.

(21) Appl. No.: 10/676,819

(22) Filed: Sep. 30, 2003

(65) Prior Publication Data
US 2005/0081105 A1    Apr. 14, 2005

(51) Int. Cl.
G06F 9/44 (2006.01)
G06F 11/00 (2006.01)
G06F 3/00 (2006.01)

(52) U.S. Cl. .......................... 717/110; 714/19; 715/700

(58) Field of Classification Search ............ 714/19; 717/100–103, 110–113; 715/530, 531, 771, 715/700; 345/666
See application file for complete search history.

(56) References Cited

U.S. PATENT DOCUMENTS

| | | | |
|---|---|---|---|
| 5,408,651 A * | 4/1995 | Flocken et al. | 714/19 |
| 5,481,710 A * | 1/1996 | Keane et al. | 719/320 |
| 5,524,205 A * | 6/1996 | Lomet et al. | 714/16 |
| 5,604,853 A * | 2/1997 | Nagashima | 715/540 |
| 5,659,747 A * | 8/1997 | Nakajima | 713/1 |
| 5,990,906 A * | 11/1999 | Hudson et al. | 345/666 |
| 6,041,423 A * | 3/2000 | Tsukerman | 714/19 |
| 6,111,575 A * | 8/2000 | Martinez et al. | 715/810 |
| 6,167,455 A * | 12/2000 | Friedman et al. | 719/320 |
| 6,185,591 B1 * | 2/2001 | Baker et al. | 715/531 |
| 6,192,378 B1 * | 2/2001 | Abrams et al. | 707/204 |
| 6,377,964 B1 * | 4/2002 | Sano | 715/530 |
| 6,523,134 B2 * | 2/2003 | Korenshtein | 714/16 |
| 6,527,812 B1 * | 3/2003 | Bradstreet | 715/530 |
| 6,543,006 B1 * | 4/2003 | Zundel et al. | 714/19 |
| 7,003,695 B2 * | 2/2006 | Li | 714/19 |
| 7,036,044 B1 * | 4/2006 | Verma et al. | 714/19 |
| 7,155,666 B2 * | 12/2006 | Breuer et al. | 715/255 |
| 7,174,481 B1 * | 2/2007 | Di Fabbrizio et al. | 714/35 |
| 7,203,866 B2 * | 4/2007 | Di Fabbrizio et al. | 714/38 |
| 7,207,034 B2 * | 4/2007 | Burke et al. | 717/110 |

(Continued)

OTHER PUBLICATIONS

HTML 4.01 Specification, W3C <http://www.w3.org/TR/html401/>, Dec. 1999.*

(Continued)

*Primary Examiner*—Wei Y Zhen
*Assistant Examiner*—Qing Chen
(74) *Attorney, Agent, or Firm*—Finnegan, Henderson, Farabow, Garrett & Dunner, LLP

(57) ABSTRACT

Methods and apparatus, including computer program products, implementing techniques for undoing user actions in a client program. The techniques include displaying a user interface in a client program, the user interface having a plurality of controls, the plurality of controls including multiple types of controls, each control having a state; for each control in the plurality of controls, storing the state of the control as a first state for the control; receiving user input comprising a change to the state of a control in the plurality of controls; updating the state of the control based on the user input; storing the updated state of the control as a second state for the control; receiving user input comprising a request to undo the change; and restoring the state of the control to reflect the first state for the control.

11 Claims, 3 Drawing Sheets

U.S. PATENT DOCUMENTS

| | | | | |
|---|---|---|---|---|
| 7,249,174 | B2* | 7/2007 | Srinivasa et al. | 709/223 |
| 7,299,450 | B2* | 11/2007 | Livshits et al. | 717/121 |
| 7,386,834 | B2* | 6/2008 | Van De Vanter et al. | 717/110 |
| 2002/0138595 | A1* | 9/2002 | Ruellan et al. | 709/219 |
| 2004/0006764 | A1* | 1/2004 | Van De Vanter et al. | 717/112 |
| 2004/0205663 | A1* | 10/2004 | Mohamed | 715/530 |

OTHER PUBLICATIONS

Leeman, Jr., George B., "A Formal Approach to Undo Operations in Programming Languages," 1986, ACM, p. 50-87.*

Prakash et al., "Undoing Actions in Collaborative Work," 1992, ACM, p. 273-280.*

Berlage, Thomas, "A Selective Undo Mechanism for Graphical User Interfaces Based on Command Objects," 1994, ACM, p. 269-294.*

Prakash et al., "A Framework for Undoing Actions in Collaborative Systems," 1994, ACM, p. 295-330.*

Edwards et al., "A Temporal Model for Multi-Level Undo and Redo," 2000, ACM, p. 31-40.*

Sun, Chengzheng, "Undo Any Operation at Any Time in Group Editors," 2000, ACM, p. 191-200.*

Chen et al., "Undoing Any Operation in Collaborative Graphics Editing Systems," 2001, ACM, p. 197-206.*

Washizaki et al., "Dynamic Hierarchical Undo Facility in a Fine-Grained Component Environment," 2002, Australian Computer Society, Inc., p. 191-199.*

Wang et al., "Achieving Undo in Bitmap-Based Collaborative Graphics Editing Systems," 2002, ACM, p. 68-76.*

Information Disclosure Statement (IDS), filed Mar. 4, 2004, in U.S. Appl. No. 10/676,819.

* cited by examiner

UNDOING USER ACTIONS IN A CLIENT PROGRAM

BACKGROUND

The present invention relates to data processing by digital computer, and more particularly to undoing user actions in a client program.

Client-server applications typically include an application component running on a server, and a client program running on a client computer. The client program renders a user interface through which a user can interact with the application. The user interface can contain one or more controls. A control is a user interface element through which a user interacts with, provides input to, or controls an application. Examples of controls are text fields, radio buttons, tables, trays, and drop-down menus.

Once a user provides input to a control, the user may at a later time wish to undo the input. However, conventional undo techniques for client-server applications are limited in functionality. For example, the undo functionality may only be available for text fields and only available while the input focus remains on the text field.

SUMMARY OF THE INVENTION

The present invention provides methods and apparatus, including computer program products, implementing techniques for undoing user actions in a client program.

In general, in one aspect, the techniques include displaying a user interface in a client program, the user interface having a plurality of controls, the plurality of controls including multiple types of controls, each control having a state; for each control in the plurality of controls, storing the state of the control as a first state for the control; receiving user input comprising a change to the state of a control in the plurality of controls; updating the state of the control based on the user input; storing the updated state of the control as a second state for the control; receiving user input comprising a request to undo the change; and restoring the state of the control to reflect the first state for the control.

Advantageous implementations of the invention include one or more of the following features. The multiple types of controls include one or more of a text field control type, a radio button control type, a table control type, a tray control type, and a menu control type. The user input comprising the request to undo the change is received while focus is not on the control.

The state of the control includes a data state and a view state. The operations further include determining whether the change affects the data state or the view state of the control; and restoring the state of the control only if the change affects the data state of the control. The operations further include receiving user input comprising a request to redo the change to the control; and restoring the state of the control to reflect the second state for the control.

Restoring the state of the control includes restoring the state of another control that shares data with the control. Restoring the state of the control occurs prior to transmitting the state of the control to a server.

In general, in another aspect, the techniques include generating at least one data structure that stores application data, and associations between the application data and one or more application controls that are rendered based on the stored application data; detecting that the at least one data structure has changed from a prior state to a new state; recording the prior state of the at least one data structure; receiving user input requesting that an undo operation be performed; and performing the undo operation by restoring the at least one data structure to the prior state.

Advantageous implementations of the invention include one or more of the following features. The at least one data structure is at least one data tree. The at least one data structure is stored on a client device. The application controls include multiple types of controls. The associations between the application data and the application controls are defined by metadata for the application.

The invention can be implemented to realize one or more of the following advantages. The undo mechanism can run in a web browser. The undo mechanism can operate on different types of controls. The undo mechanism can be invoked to undo user actions or to restore user input to a control even after the input focus has shifted away from the control. The scope of the undo mechanism can be changed so as to undo only certain types of user modifications (e.g., modifications that affect data, or modifications that affect formatting). The undo mechanism can be used to undo user actions at different levels of granularity. When the undo mechanism is invoked to undo a change (e.g., to undo user action or restore user input) for a particular control, and that control shares data with another control, the change is undone for both controls, thereby maintaining data consistency.

The undo mechanism does not need to be coded independently for each control in the client program. Because the undo mechanism is independent from the controls, the undo mechanism can automatically extend to new controls that are added to the client program. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
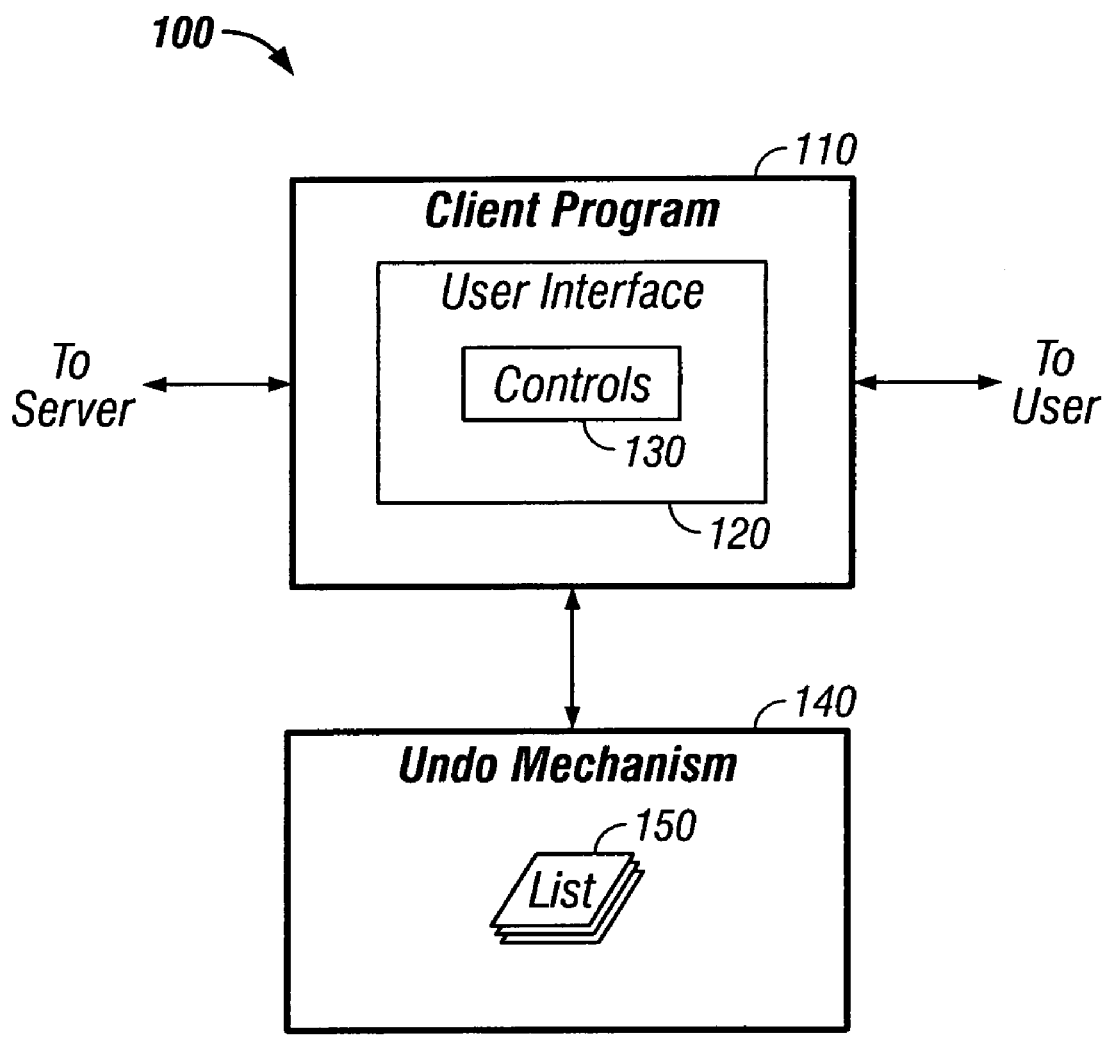
FIG. 1 is a block diagram of a system in accordance with the invention.

As illustrated in FIG. 1, a system 100 in accordance with the invention includes a client program 110 running on a client computer. The client program 110 renders a user interface 120 through which a user can interact with an application that is running on a server computer. The user interface 120 contains one or more controls 130. The controls 130 include multiple types of controls including text fields, radio buttons, table controls, trays and menus.

Each control 130 has a state that can include a view state and a data state. The visual properties of the control define the view state of the control. Examples of visual properties include the visibility of a tray control (e.g., expanded or collapsed), or the scroll position of a table control. Data associated with the control defines the data state of the control. The data can include different types of data including strings, booleans, or objects (e.g., a Java.util.date object).

The system also includes an undo mechanism 140 that can be invoked by a user to undo or redo prior user actions taken with respect to the controls before the user actions have been transmitted to the server. For example, the undo mechanism 140 can be invoked to undo a delete operation performed by the user with respect to a control, thereby restoring prior input provided by the user to that control. The undo mechanism 140 can also provide a redo operation that negates the effect of the undo operation. The undo mechanism 140 can be integrated as part of the client program 110 or alternatively can be separate from the client program 110.

The undo mechanism 140 is operable to record the initial state of the controls and to detect subsequent changes in the state of the controls. The state of a control can change as a result of user interaction with the control, for example, user entry of data into a text field, user selection of a radio button, or user manipulation of a scroll bar. The undo mechanism 140 is operable to store the initial state and the subsequent states of each control in one or more lists 150. A list 150 can be implemented using an ordered data structure such as a stack or a queue, with the most current state being at the top of the stack or the front of the queue. In one implementation, a pointer is used to identify the stack entry that corresponds to the current data state. Initially, the pointer points to the top of the stack. As each undo operation is performed, the pointer position moves down the stack. As each redo operation is performed, the pointer position moves up the stack. When new user input is received, any entries between the current pointer position and the top of the stack are removed, a new entry corresponding to the new user input is added to the new top of the stack, and the pointer position is set to the new entry. Once the state of the controls has been transmitted to the server, the stack is cleared.

Figure 2:
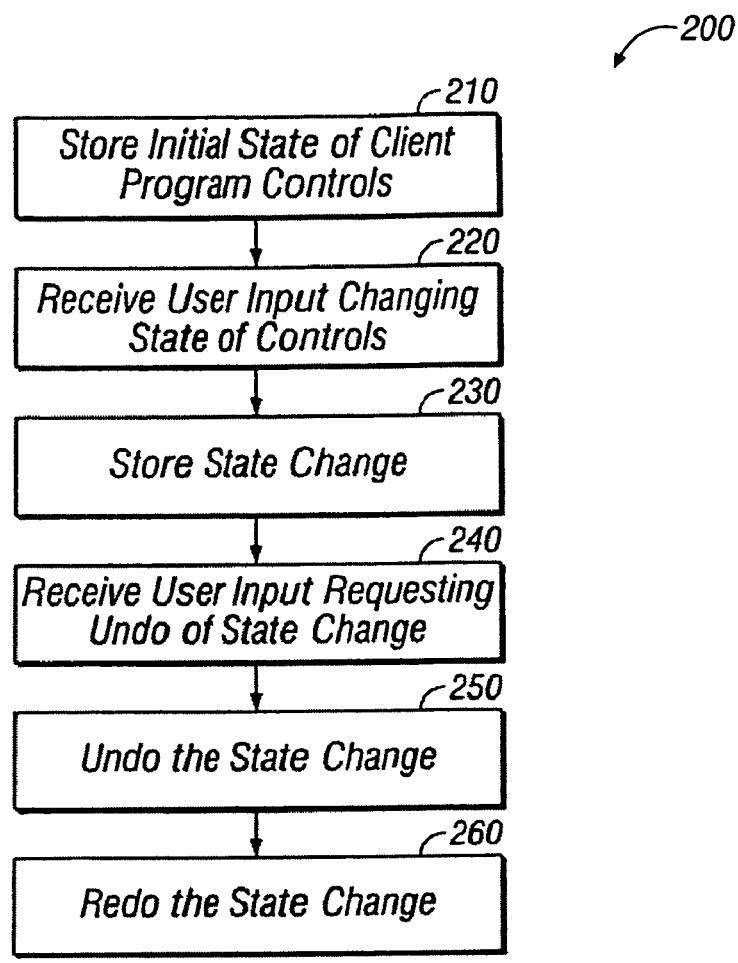
FIG. 2 is a flow diagram of a method in accordance with the invention.

In operation, as illustrated by the method 200 of FIG. 2, the system 100 stores the initial state of the controls in the list 150 (step 210). The system receives user input that changes the state of one or more of the controls 130 (step 220). The system stores the state change in the list 150 (step 230). Subsequently, the system receives user input requesting to undo the change (step 240). The input focus need not be on the control to be changed when the user makes such a request. For example, the user can enter data into a first text field, press the tab key to establish focus on a second text field, and then invoke undo to undo the change to the first text field.

In response to the undo request, the system invokes the undo mechanism 140 to undo the change (step 250). The undo mechanism uses the undo list 150 to restore one or more of the controls to the state immediately prior to the current state. In the pointer implementation described above, restoring one or more of the controls to the state immediately prior to the current state involves repositioning the pointer so that it points to the stack entry immediately below the stack entry previously pointed to.

The mechanism can also redo a state change in response to user input requesting such an action (step 260). In the pointer implementation described above, the undo mechanism performs a redo operation by repositioning the pointer so that it points to the stack entry immediately above the stack entry previously pointed to.

Scope and Granularity Settings

In some implementations, the undo mechanism 140 can be configured according to a variety of settings, including scope settings and granularity settings. Scope settings can be used to indicate the types of changes that can be undone. For example, the undo mechanism 140 can be configured to undo all state changes (e.g., both view state changes and data state changes), or only certain kinds of state changes (e.g., data state changes only). In such an implementation, the undo mechanism 140 can distinguish between data state changes and view state changes, and if only the data state changes are to be undone, then the undo mechanism does not need to store the view state changes in the list 150.

Granularity settings can be used to specify the level at which user actions to be undone and/or redone. For example, the granularity level can specify that user actions are to be undone at a character, string, or field level. A character-level undo undoes the last character that was entered. For example, if the last user input were a character string "Hello", a character-level undo would only undo the "o" character, but not the entire string. A string-level undo undoes not only the last character, but also the entire string that includes the last character. Thus, in the example above, the entire string "Hello" would be undone. A field-level undo treats an entire field as an atomic unit. For example, a field can include one or more character strings as well as other input such as TAB or Enter keystrokes. A field-level undo would undo all the input in the field, not just a single string or a single character.

In one implementation, the field-based undo is implemented by monitoring a data tree, as described below. For other granularities, the undo mechanism can be implemented with a different monitoring process. For example, a character-based undo mechanism can be implemented by monitoring the user input events detected by the system.

Data Trees

Figure 3:
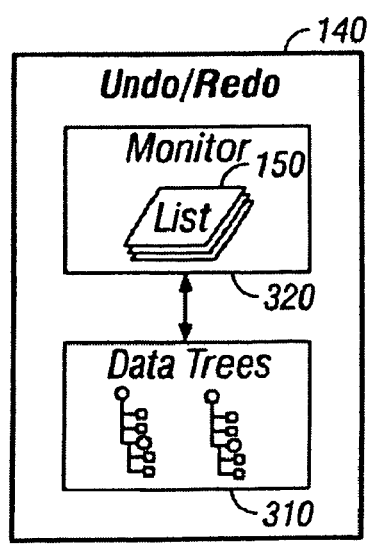
FIG. 3 is a block diagram of one implementation of the system.
Figure 4:
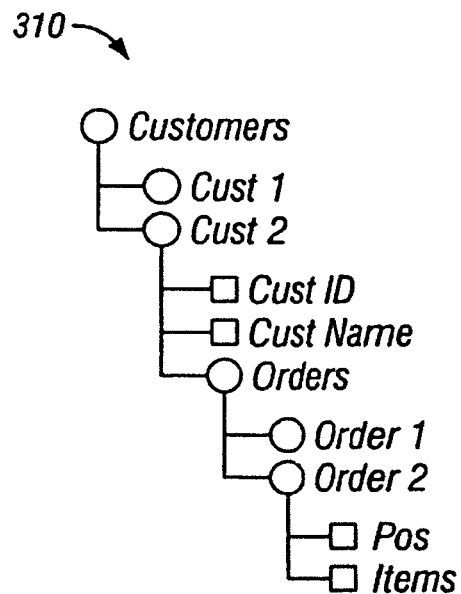
FIG. 4 is an exemplary data tree.
Figure 5:
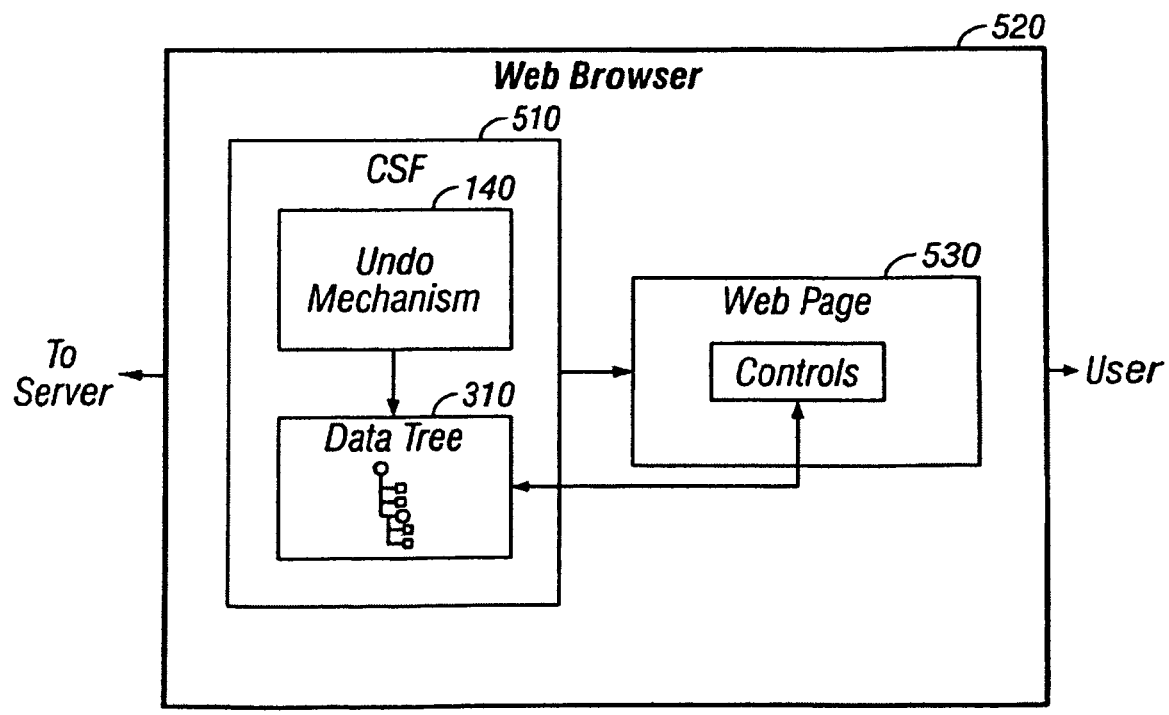
FIG. 5 is a block diagram of one implementation of the system.

In one implementation of the system 100, the undo mechanism detects changes to the controls by monitoring one or more data trees 310. As shown in FIG. 3, the one or more data trees 310 store the data associated with each control 130. Each control 130 includes a reference to the node in the data tree 310 where the control's data is stored. As shown in FIGS. 3 and 5, and also depicted in FIG. 4, a data tree may include more than one node.

The data stored in the data tree includes state information that can include both view state and data state information for the controls. Upon detecting a change in the view state or data state of a control, the corresponding node in the data tree is updated to reflect the change. The methods used to update the view state (view state update methods) can differ from the methods used to update the data state (data state update methods).

A monitoring process 320 monitors the data tree for changes and records the changes in the list 150. The monitoring process can record all changes; alternatively, it can distinguish between view state and data state changes and only record the data state changes. In an implementation in which different methods are used to update view states and data states, the monitoring process can distinguish between view state and data state changes by determining whether view state update methods or data state update methods were invoked to update the data tree.

The undo mechanism uses the list 150 generated by the monitoring process to keep track of the current and past states of the data tree. When a user requests an undo operation be performed, the undo mechanism can use the list 150 to restore the data tree to a prior state.

Framework

In one implementation of the system 100, as shown in FIG. 5, the client program 110 is a Web browser 520, the user interface 120 is a Web page 530, and the undo mechanism 140 is provided by a software framework 510 running in the Web browser 520.

The Web browser 520 communicates with the server using HTTP (Hypertext Transfer Protocol). HTTP is a stateless protocol, meaning that each time the Web browser 520 requests a Web page 530, the server will respond to the request independently of any previous requests by the client device. The server response generally includes code, for example, HTML (Hypertext Markup Language) code, that specifies how to render the Web page 530. Rendering the Web page 530 can involve generating a document object model (DOM) representation of the Web page 530.

The server response can also include code for establishing the framework 510 in the Web browser 520. The framework code can include client-side scripting code such as, for example, JAVASCRIPT™ or VBScript code. The framework code can be embedded in the code for the Web page 530 or stored as a separate file that is referenced by the code for the Web page 530. The framework code can be generated based on metadata for the application that is running on the server.

Once established, the framework 510 includes one or more data structures (e.g., data trees) that store the state of each control in the Web page 530. The framework 510 monitors the changes to the state of each control by monitoring the one or more data structures. The framework 510 records the state changes in a list which can then be used by the undo mechanism 140 to undo the changes as described above. The undo mechanism 140 in such an implementation is independent of the controls, which means that the undo mechanism 140 can automatically provide undo functionality for new controls (or new types of controls) added to the client program without requiring code for an undo function for each new control (or each new type of control).

In one implementation, each data element appears only once in the data structures, even if the data element is associated with more than one control. For example, the data element that stores zip code information can be associated with a first text field that displays the zip code and a second text field that displays the city name. When the undo operation is invoked to restore the value of the zip code field, the city name field will be restored as well.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied on a machine-readable storage device, the computer program product comprising instructions operable to cause a data processing apparatus to perform a method, the method comprising:

displaying a graphical user interface in a client program, the graphical user interface having a plurality of graphical user interface elements, the plurality of graphical user interface elements having data structures indicating a data state corresponding to data content of the plurality of graphical user interface elements and a view state corresponding to a visual configuration of the plurality of graphical user interface elements;

storing the data state and the view state of at least one of the plurality of graphical user interface elements as a first state for the at least one graphical user interface element in a data structure corresponding to the at least one graphical user interface element;

receiving user input from a user comprising a change to the data state and the view state of the at least one graphical user interface element;

updating the data state and the view state of the at least one graphical user interface element based on the received user input;

storing the updated data state and view state of the at least one graphical user interface element as a second state for the at least one graphical user interface element in the data structure corresponding to the at least one graphical user interface element;

receiving undo scope setting information associated with the at least one graphical user interface element;

receiving user input from a user comprising a request to undo the change to the at least one graphical user interface element;

determining whether the undo scope setting information indicates the data state, the view state, or both the data state and the view state;

when the undo scope setting information is determined to indicate the data state, performing the undo request by restoring only the data state of the at least one graphical user interface element to reflect the first state;

when the undo scope setting information is determined to indicate the view state, performing the undo request by restoring only the view state of the at least one graphical user interface element to reflect the first state; and when the undo scope setting information is determined to indicate both the data state and the view state, performing the undo operation by restoring both the data state and the view state for the at least one graphical user interface element to reflect the first state.

2. The computer program product of claim 1, wherein the plurality of graphical user interface elements includes one or more text field elements, radio button elements, table elements, tray elements, and menu elements.

3. The computer program product of claim 1, wherein the method further comprises:

receiving user input from a user comprising a request to redo the change to the at least one graphical user interface element; and performing the redo request by restoring the data state and the view state of the at least one graphical user interface element to reflect the second state.

4. The computer program product of claim 1, wherein the received user input comprising the request to undo the change to the at least one graphical user interface element is received while input focus is not on the at least one graphical user interface element.

5. The computer program product of claim 1, wherein the undo scope setting information further indicates a second graphical user interface element of plurality of graphical user interface elements that is associated with the at least one graphical user interface element, and the method further includes performing the undo request by restoring a state of the second graphical user interface element in addition to restoring the state of the at least one graphical user interface element.

6. A computer program product, tangibly embodied on a machine-readable storage device, the computer program product comprising instructions operable to cause a data processing apparatus to perform a method, the method comprising:

generating a plurality of data structures that store application data and associations between the application data and a plurality of graphical user interface elements associated with an application, the plurality of graphical user interface elements having data structures indicating a data state corresponding to data content of the plurality of graphical user interface elements and a view state corresponding to a visual configuration of the plurality of graphical user interface elements, wherein the plurality of graphical user interface elements are rendered based on the application data;

detecting that the data state and the view state of a first graphical user interface element of the plurality of graphical user interface elements has changed from an initial state to a new state;

recording the initial state of the first graphical user interface element in a data structure associated with the first graphical user interface element;

recording the new state of the first graphical user interface element in the data structure associated with the first graphical user interface element;

receiving undo scope setting information associated with the first graphical user interface element;

receiving user input from a user requesting that an undo operation be performed on the first graphical user interface element;

determining whether the undo scope setting information indicates the data state, the view state, or both the data state and the view state;

when the undo scope setting information indicates the data state, performing the undo operation by restoring only the data state of the first graphical user interface element to the first initial state;

when the undo scope setting information indicates the view state, performing the undo operation by restoring only the view state of the first graphical user interface element to the initial state; and when the undo scope setting information indicates both the data state and the view state, restoring both the data state and the view state of the first graphical user interface element to the initial state.

7. The computer program product of claim 6, wherein the plurality of data structures comprise at least one data tree.

8. The computer program product of claim 6, wherein the plurality of data structures are stored on a client device.

9. The computer program product of claim 6, wherein the plurality of graphical user interface elements includes multiple types of graphical user interface elements.

10. The computer program product of claim 6, wherein the associations between the application data and the plurality of graphical user interface elements are defined by metadata.

11. An apparatus comprising:

means for displaying a graphical user interface in a client program, the graphical user interface having a plurality of graphical user interface elements, the plurality of graphical user interface elements having data structure structures indicating a data state corresponding to data content of the plurality of graphical user interface elements and a view state corresponding to a visual configuration of the plurality of graphical user interface elements;

means for storing, in a data structure associated with a first graphical user interface element of the plurality of graphical user interface elements, the data state and the view state of the first graphical user interface element as a first state for the first graphical user interface element;

means for receiving user input from a user comprising a change to the data state and the view state of the first graphical user interface element;

means for updating the changed data state and view state of the first graphical user interface element based on the received user input;

means for storing the updated data state and view state of the first graphical user interface element as a second state for the first graphical user interface element in the data structure associated with the first graphical user interface element;

means for receiving undo scope setting information associated with the first graphical user interface element;

means for receiving user input from a user comprising a request to undo the change to the first graphical user interface element;

means for determining whether the undo scope setting information indicates the data state, the view state, or both the data state and the view state;

means for, when it is determined that the undo scope setting information indicates the data state, performing the undo request by restoring only the data state of the first graphical user interface element to reflect the first state;

means for, when it is determined that the undo scope setting information indicates the view state, performing the undo request by restoring only the view state of the first graphical user interface element to reflect the first state; and means for, when it is determined that the undo scope setting information indicates both the data state and the view state, performing the undo request by restoring both the data state and the view state of the first graphical user interface element to reflect the first state.

* * * * *